United States Patent
Peuchert et al.

(10) Patent No.: US 7,799,444 B2
(45) Date of Patent: Sep. 21, 2010

(54) CONVERSION MATERIAL

(75) Inventors: Ulrich Peuchert, Bodenheim (DE);
Thilo Zachau, Buerstadt-Riedrode (DE);
Martin Letz, Klein-Winternheim (DE);
Joseph S. Hayden, Clarks Summit, PA (US); Carol Click, Clarks Green, PA (US); Karine Seneschal, Mainz (DE);
Axel Engel, Ingelheim (DE)

(73) Assignee: Schott AG, Mainz (DE)

( * ) Notice: Subject to any disclaimer, the term of this patent is extended or adjusted under 35 U.S.C. 154(b) by 635 days.

(21) Appl. No.: 11/236,756

(22) Filed: Sep. 27, 2005

(65) Prior Publication Data

US 2006/0181196 A1     Aug. 17, 2006

(30) Foreign Application Priority Data

Sep. 29, 2004     (DE) .................. 10 2004 048 041

(51) Int. Cl.
*B32B 9/04*     (2006.01)
*G03C 5/04*     (2006.01)

(52) U.S. Cl. .................. 428/701; 428/633; 430/494

(58) Field of Classification Search .................. 252/301; 313/485; 372/22; 428/633, 701; 430/494
See application file for complete search history.

(56) References Cited

U.S. PATENT DOCUMENTS

| | | | |
|---|---|---|---|
| 3,843,551 A | 10/1974 | Muller et al. | |
| 4,088,023 A | 5/1978 | Berleue et al. | |
| 4,530,909 A | 7/1985 | Makishima et al. | |
| 5,537,505 A | 7/1996 | Borrelli et al. | |
| 5,670,086 A * | 9/1997 | Papadopoulos et al. | 252/301.4 P |
| 5,801,483 A * | 9/1998 | Watanabe et al. | 313/485 |
| 6,482,758 B1 | 11/2002 | Weber et al. | |
| 2001/0030326 A1* | 10/2001 | Reeh et al. | 257/98 |
| 2002/0154663 A1* | 10/2002 | Zhu et al. | 372/22 |
| 2004/0148966 A1* | 8/2004 | Celikkaya et al. | 65/17.4 |
| 2004/0213539 A1* | 10/2004 | Anderson et al. | 385/142 |
| 2004/0233514 A1 | 11/2004 | Takagi et al. | |
| 2006/0166804 A1* | 7/2006 | Sprenger et al. | 501/10 |

FOREIGN PATENT DOCUMENTS

| | | |
|---|---|---|
| DE | 100 63 939 A1 | 7/2002 |
| DE | 101 37 641 A1 | 2/2003 |
| DE | 103 11 820 A1 | 9/2004 |
| EP | 0 847 964 A1 | 6/1998 |

(Continued)

OTHER PUBLICATIONS

Stic plus search 1.*

(Continued)

*Primary Examiner*—Jennifer C McNeil
*Assistant Examiner*—Lauren Robinson
(74) *Attorney, Agent, or Firm*—Harness, Dickey & Pierce, P.L.C.

(57) ABSTRACT

The invention describes a glass and a glass-ceramic which at least includes the constituents $SiO_2$, $Al_2O_3$ and $Y_2O_3$ and is preferably doped with rare earth ions. The weight ratio between the weight of $Y_2O_3$ and the total weight of $SiO_2$, $Al_2O_3$ and $Y_2O_3$ is at least 0.2, preferably at least 0.4 or more. The rare earth ions can preferably be incorporated in crystal phases which are precipitated out of glass with a high yttrium content.

22 Claims, 3 Drawing Sheets

FOREIGN PATENT DOCUMENTS

| | | |
|---|---|---|
| EP | 0 924 171 A1 | 6/1999 |
| JP | 4-119941 | 4/1992 |
| JP | 2000281382 A | 10/2000 |
| JP | 2004-250251 * | 9/2004 |
| WO | 2004/031089 A1 | 4/2004 |
| WO | WO 2004-031089 * | 4/2004 |

OTHER PUBLICATIONS

Stic plus search 2.*
Wang et al. (Optical Letters, vol. 21, No. 11, Jun. 1, 2006).*
Zhang et al. (J. Phys. D: Appl. Phys. 35 (2002) 3085-3090).*
Weik ("Fiber Opticals Standard Dictionary").*
Yamamoto (Patent Abstract of Japan JP 04-119941,http://www.ipdl.inpit.go.jp/homepg_e.ipdl) obtained Jul. 21, 2009.*
Takagi translation (www. esp@cenet.com) obtained Jul. 21, 2009.*
Cpeo (http://www.cpeo.org /techtree/ttdescript/ssvit.htm) obtained Jul. 21, 2009.*
M.R. Krames et al.; "High-Power III-Nitride Emitters for Solid-State Lighting"; 2002; pp. 237-245.

* cited by examiner

CONVERSION MATERIAL

BACKGROUND OF THE INVENTION

The invention relates to a glass or glass-ceramic and to an advantageous use thereof. More particularly, the invention relates to a glass or glass ceramic that can be used as a conversion material for converting radiation of a first energy into radiation of as second energy, such as for converting blue light into white light.

Light sources are generally divided into discharge lamps and solid-state lamps. Among solid-state lamps, heat radiators dominate for general-purpose illumination and automotive applications, i.e. applications which require absolute brightnesses, e.g. halogen lamps. In addition, solid-state light sources in the form of luminescence radiators, such as for example inorganic LEDs, are known.

LEDs are generally highly advantageous, since they combine a number of properties including: a high efficiency as a result of direct conversion of electrical energy into light energy, compactness (punctiform radiators, which means that there is a wide range of design options for illumination systems), different colours (dynamic light matching and user-orientated illumination are possible using colour-mixing concepts).

Until a few years ago, however, LEDs were only used as low-emitting applications, in particular for displays. In recent times, however, the considerable potential of LEDs for applications with a higher demand for light has been recognized, and increased efforts have been made to achieve improved introduction of energy and an improved heat management in LEDs. However, more intensive utilization of LEDs for general illumination purposes or for use in automotive applications requires further adjustment to design and materials used with a view to:

further increasing the efficiency (into the range of florescent lamps, i.e. approx. 100 lm/W), increasing the absolute introduction of energy in order to generate even greater brightnesses (50 to 2000 lm), improving the discharge of light, improving the conversion of high-power LEDs which emit in the blue or UV region, in order to produce as ideal a white colour sensation as possible, improving the thermal and UV long-term stability of the materials used in an LED.

LEDs generate light in a very narrow spectral region, whereas illumination purposes generally require white light. Commercially available white LEDs use a III-V semiconductor emitter to excite a luminescent material which emits a secondary wavelength in a lower wavelength region (down-conversion). One known option uses a blue InGaN/GaN LED to excite a broad-band, yellow phosphor, YAG: Ce. With these phosphor-converted LEDs, a certain proportion of the blue emission passes through the phosphor layer which covers the LED chip, so that the overall spectrum which results has a colour very close to that of white light. In this context, however, in most cases the colour is unsatisfactory owing to the absence of spectral components in the blue/green region and the red wavelength region.

A further approach consists in using a semiconductor emitter which emits in the UV or near-UV region and is coupled to a full-colour phosphor system. This allows white light sources of satisfactory colour to be realized (cf. Phys. Stat. Sol. (a) 192, No. 2, 237-245 (2002), M. R. Krames et al.: "High-Power III-Nitride Emitters for Solid-State Lighting").

In this case, the phosphor particles are embedded in epoxy resin and applied as luminescent layer to the semiconductor emitter.

In the abovementioned phosphor layers, which are used to convert the light emitted by the LEDs in a desired spectral region, in particular to generate white light, certain drawbacks result from the fact that the phosphors used are embedded in epoxy resin. The granules used cause scattering losses. An inhomogeneous distribution of the granules on the semiconductor emitter can lead to different colour sensations depending on angle. Furthermore, epoxy resins in many respects lack long-term stability, in particular in terms of their optical and mechanical properties. The thermal stability is generally also insufficient to: generate high brightnesses. Moreover, the production of conversion layers of this type is complex and expensive.

Furthermore, it is known from JP 2001 214162 to use a phosphor which has an oxynitride glass matrix comprising 20 to 50 Mol % of CaO, 0 to 30 Mol % of $Al_2O_3$, 25 to 60 Mol % of $SiO_2$, 5 to 50 Mol % of AlN and 0.1 to 20 Mol % of a rare earth oxide and a transition metal oxide, to generate white light by means of an LED which emits in the blue region.

DE 101 37 641 A1 discloses a hybrid LED which converts the light spectrum pre-dominantly in the UV region emitted by an LED into a longer-wave light spectrum by means of a luminescent glass body.

However, this publication does not give any details as to the structure of the luminescent glass body.

Although, in principle, luminescent glasses which are doped with rare earths and are used in particular in ophthalmology, as filters, in laser applications, for upwards conversion and for luminescence applications, are known, the prior art does not disclose any luminescent glasses which are suitable for generating white light with a sufficiently high quality and intensity to allow them to be used, of example, for indoor illumination purposes.

For example, JP 2000 281 382 A discloses silicate glasses and glass-ceramics which contain rare earth cations in order to generate the luminescence. These glasses and glass-ceramics contain from 30 to 70 Mol % of $SiO_2$, up to 10 Mol % of $GeO_2$, from 5 to 40 Mol % of MgO and from 10 to 55 Mol % of MO, where M is selected from Ca, Sr and Ba.

EP 0 847 964 A1 discloses an oxidic fluorescent glass which contains 2 to 60 Mol % of $SiO_2$, 5 to 70 Mol % of $B_2O_3$ and 5 to 30 Mol % of RO, where R is selected from Mg, Ca, Sr and Ba. 2 to 15 Mol % of $Tb_2O_3$ or $Eu_2O_3$ are added for luminescence purposes.

U.S. Pat. No. 4,530,909 discloses an aluminosilicate glass which contains from 30 to 60 Mol % of $SiO_2$, 20 to 35 Mol % of $Al_2O_3$ and 10 to 30 Mol % of an yttrium concentrate which predominantly comprises $Y_2O_3$ and also contains rare earth oxides as well as $ZrO_2$.

This glass is extremely complicated to produce. Also, the glass does not have the required luminescence properties.

SUMMARY OF THE INVENTION

In view of this, it is first object of the invention to disclose a glass or glass-ceramic which is suitable for a high level of doping with rare earth ions.

It is a second object of the invention to disclose an optical material having a good luminescence characteristic which is particularly suitable for the conversion of light from cold light sources (LEDs or discharge lamps) into light of a different wavelengths spectrum.

It is a third object of the invention to disclose a material suitable for the conversion of radiation of various kinds into a different radiation having a different energy and/or a different wavelength spectrum, such as the conversion of blue or UV radiation into white light (down-conversion), for the conversion of X-ray radiation or neutron radiation preferably into visible light.

It is a forth object of the invention to disclose a material that can be used in scintillation applications with respect to X-ray radiation, neutron radiation or any other radiation.

It is another object of the invention to disclose a material that can be used as optical material having a high refractive index, as optical having a high thermal stability, as an alkali-metal-free substrate for TFT display applications, as a highly thermally stable tube for lamp bulbs, as a high-strength substrate material for hard disc applications and as target material for coating oxidic, metallic or semiconducting substrates.

It is another object of the invention to disclose a material that can be used in a laser application, wherein, by contrast to the conventional laser application with mirrors, the luminescence and dispersion of the material can be used to produce a broadened light ray which is emitted over a broader range of wavelengths.

According to the invention, these and other objects of the invention are achieved by a glass or glass-ceramic at least comprising the constituents $SiO_2$, $Al_2O_3$ and $Y_2O_3$, in which the weight ratio between the weight of $Y_2O_3$ and the total weight of $SiO_2$, $Al_2O_3$ and $Y_2O_3$ is at least 0.2, preferably at least 0.3, particularly preferably at least 0.4.

The object of the invention is fully achieved in this way.

The invention discloses a glass or glass-ceramic which has a very high $Y_2O_3$ content. This on the one hand makes it possible to achieve effective doping with rare earth ions in order to produce particularly advantageous luminescence properties. On the other hand, advantageous applications without doping with rare earth ions also become possible, for example as alkali-metal-free substrates for TFT display applications, as highly thermally stable tubes for lamp bulbs, as high-strength substrate materials for hard disc applications or as target material for coating oxidic, metallic substrates. This also produces a very high-melting glass with a high refractive index which is very thermally stable and can be used for optical purposes.

In an advantageous refinement of the invention, the glass or glass-ceramic is provided with a doping of at least one rare earth ion. It is in this way possible to make use of the advantageous properties of the high yttrium content in order to incorporate rare earth ions in the glass matrix or in crystalline phases. This is possible because yttrium ions and rare earth ions are chemically very similar. The position of the yttrium can be partially replaced by rare earths both in the glass network and in crystal phases. It is in this way possible to produce particularly advantageous luminescence properties.

According to a further configuration of the invention, the weight ratio between the weight of $SiO_2$ and the total weight of $SiO_2$, $Al_2O_3$ and $Y_2O_3$ is at most 0.5.

Furthermore, the weight ratio between the weight of $Al_2O_3$ and the total weight of $SiO_2$, $Al_2O_3$ and $Y_2O_3$ is preferably at most 0.6, in particular at most 0.55.

If these limit values are observed, the properties of the three-phase system $SiO_2$—$Al_2O_3$—$Y_2O_3$ can advantageously be utilized to produce host phases for the incorporation of rare earth ions.

Irrespective of the nature of the base glass, the invention also proposes the creation of a glass-ceramic which contains crystalline phases which at least partially incorporate rare earth ions.

These phases may in particular be at least one of the phases $Y_3Al_5O_{12}$, $Y_2SiO_5$, $Y_2Si_2O_7$ and, if alkaline-earth metals and other oxides are present in corresponding concentrations, $SrAl_2O_4$, $BaMgAl_{10}O_{17}$, $Sr_2P_2O_7$, $Sr_4Al_{14}O_{25}$ or $YBO_3$, which at least partially serve as host phase for incorporating rare earth ions.

In an advantageous refinement of the invention, the doping of the glass or glass-ceramic with rare earth ions amounts to at least 0.1% by weight (based on oxide), preferably at least 1% by weight, particularly preferably at least 2% by weight.

It is in this way possible to achieve higher efficiencies for luminescence applications. The rare earth ions used for doping may, for example, comprise Ce, Pr, Nd, Sm, Eu, Gd, Tb, Er, Tm, Yb, Dy or La. In this context, it is possible to select individual ones of these rare earths or mixtures thereof.

The glass or glass-ceramic may contain further additions, for example $B_2O_3$, $P_2O_5$, SrO, BaO, CaO, MgO, $Ga_2O_3$, $Na_2O$, $K_2O$, $Li_2O$, $TiO_2$, $ZrO_2$, $Ta_2O_5$.

However, herein the content of $ZrO_2$ is preferably limited to less than 5 wt.-%, preferably to a maximum of 4 wt.-%, more preferably to a maximum of 3 wt.-%, more preferably to a maximum of 1 wt.-%, or more preferably to a maximum of 0.1 wt.-%. Or the glass or glass ceramic does not contain any $ZrO_2$ at all, apart from undesired contaminations.

A first group of glasses or glass-ceramics according to the invention contains at least the following constituents (in % by weight, based on oxide):

| | |
|---|---|
| $SiO_2$ | 5–50 |
| $Al_2O_3$ | 5–50 |
| $Y_2O_3$ | 10–80 |
| $B_2O_3$ | 0–20 |
| rare earths | 0.1–30. |

In a preferred refinement of this embodiment, the following constituents are included (in % by weight, based on oxide):

| | |
|---|---|
| $SiO_2$ | 10–40 |
| $Al_2O_3$ | 10–40 |
| $Y_2O_3$ | 20–70 |
| $B_2O_3$ | 1–15 |
| rare earths | 0.5–15. |

In a further preferred embodiment, the following constituents are included (in % by weight, based on oxide):

| | |
|---|---|
| $SiO_2$ | 15–35 |
| $Al_2O_3$ | 15–35 |
| $Y_2O_3$ | 25–60 |
| $B_2O_3$ | 1–60 |
| rare earths | 1–15. |

In the glass-ceramic according to the invention, the ratio between the crystal phases and the residual glass content may advantageously be set in such a way that an approximately white colour sensation results on conversion of LED light from the blue or UV spectral region. In this case, the residual glass phase contains significant quantities of rare earth ions and forms a widened background around or between the emission wavelengths. Therefore, an improved white colour sensation can be achieved by corresponding setting of the ratio. Overall, the glass or glass-ceramic according to the invention makes it possible to achieve a colour temperature which is preferably >3600 K, in which case it is possibly to achieve a colour rendering index CRI of >85, preferably of >90, particularly preferably of >95.

The size of the crystallites can be controlled in a targeted way by the heat treatment used to convert the starting glass into a glass-ceramic. The size of the crystallites is in this case in a range between 20 nm and 2000 nm. It is preferably to set the size of the crystallites in a targeted way, so that the light which is emitted does not enter into scattering interaction, or at most a negligible scattering interaction, with the crystallites. For this purpose, the crystallite size is preferably set between 50 and 1000 nm, particularly preferably between 50 and 500 nm.

The setting of the crystallite size distribution and of the mean spacing between the crystallites can be controlled by means of the temperature management during the ceramicizing. As guideline value for a narrow crystallite size distribution, the ratio of the difference between the $99^{th}$ and $50^{th}$ percentiles to the $99^{th}$ percentile of the crystallite size $[(d_{99}-d_{50})/d_{99}]$ should preferably be $\leq 10\%$.

A narrow crystallite size distribution and a highly uniform crystallite spacing produces a predominantly coherent scattering of those light wavelengths which are below the crystallite size. The aim of utilizing this coherent scattering to increase the quantum yield of the fluorescence excitation is achieved if the crystallite size is set to be less than or equal to the light wavelength of the exciting UV light.

It should be mentioned that in this application the term "glass ceramic" is understood as a glass ceramic that has been crystallized by a controlled heat treatment above the glass transition temperature $T_g$, starting from a base glass (that is non-crystalline in general). Herein crystals are precipitated, the size and composition of which are targeted and controlled by the temperatures, heating ramps and heating times. Ceramics which are generated from glasses by spontaneous crystallization, such as generally avoided in the development of glass ceramics, are not considered as glass ceramics in this application. With respect to glass ceramics it is desired to keep the glassy state at least up to the glass transition temperature and to perform a targeted and controlled (mostly partial) crystallization.

For combination with LEDs, the coefficient of thermal expansion, in a preferred refinement of the invention, is set to between $3 \cdot 10^{-6}$ $K^{-1}$ and $7.5 \cdot 10^{-6}$ $K^{-1}$, preferably between $4.5 \cdot 10^{-6}$ $K^{-1}$ and $7.5 \cdot 10^{-6}$ $K^{-1}$. In this way, the glass or glass-ceramic according to the invention can be brought into direct contact with the LED body. On account of the matching of the coefficient of thermal expansion to Si or III-V semiconductors from the family of InGaP or InGaN, it is also possible for the glass or glass-ceramic to be deposited directly on the LED semiconductor, e.g. by means of PVD (Plasma Vapour Deposition).

As has already been mentioned, the glass or glass-ceramic according to the invention can advantageously be used as optical glass with a high refractive index, as optical glass with a high thermal stability, as glass for converting a first radiation into a different radiation having a different energy and/or a different wavelength spectrum, preferable for down-conversion of exciting radiation in the blue and UV spectral regions, as alkali-metal-free substrate for TFT display applications, as a highly thermally stable tube for lamp bulbs, as a high-strength substrate material for hard disc applications and as target material for coating oxidic, metallic or semiconducting substrates.

It will be understood that the features of the invention which have been listed above and those which are yet to be explained below can be used not only in the combination described in each instance but also in other combinations or as stand-alone features without departing from the scope of the invention.

BRIEF DESCRIPTION OF THE DRAWINGS

Further features and advantages will emerge from the following description of an exemplary embodiment with reference to the drawing, in which.

DETAILED DESCRIPTION OF THE PREFERRED EMBODIMENTS

A first glass (cf. table 1, example 1) comprising the following constituents (in % by weight, based on oxide) was melted:

| | |
|---|---|
| $SiO_2$ | 23.64 |
| $B_2O_3$ | 6.36 |
| $Al_2O_3$ | 20.91 |
| $Y_2O_3$ | 46.36 |
| $Eu_2O_3$ | 2.73 |

The glass was melted and homogenized in a platinum crucible at a temperature of approximately 1550 to 1600° C.

A clear, transparent glass was obtained after cooling to room temperature.

The material according to the invention lights up bright-orange both in the vitreous state and in the ceramicized state if it is excited with UV light ($\lambda$=250 to 400 nm).

Figure 1:
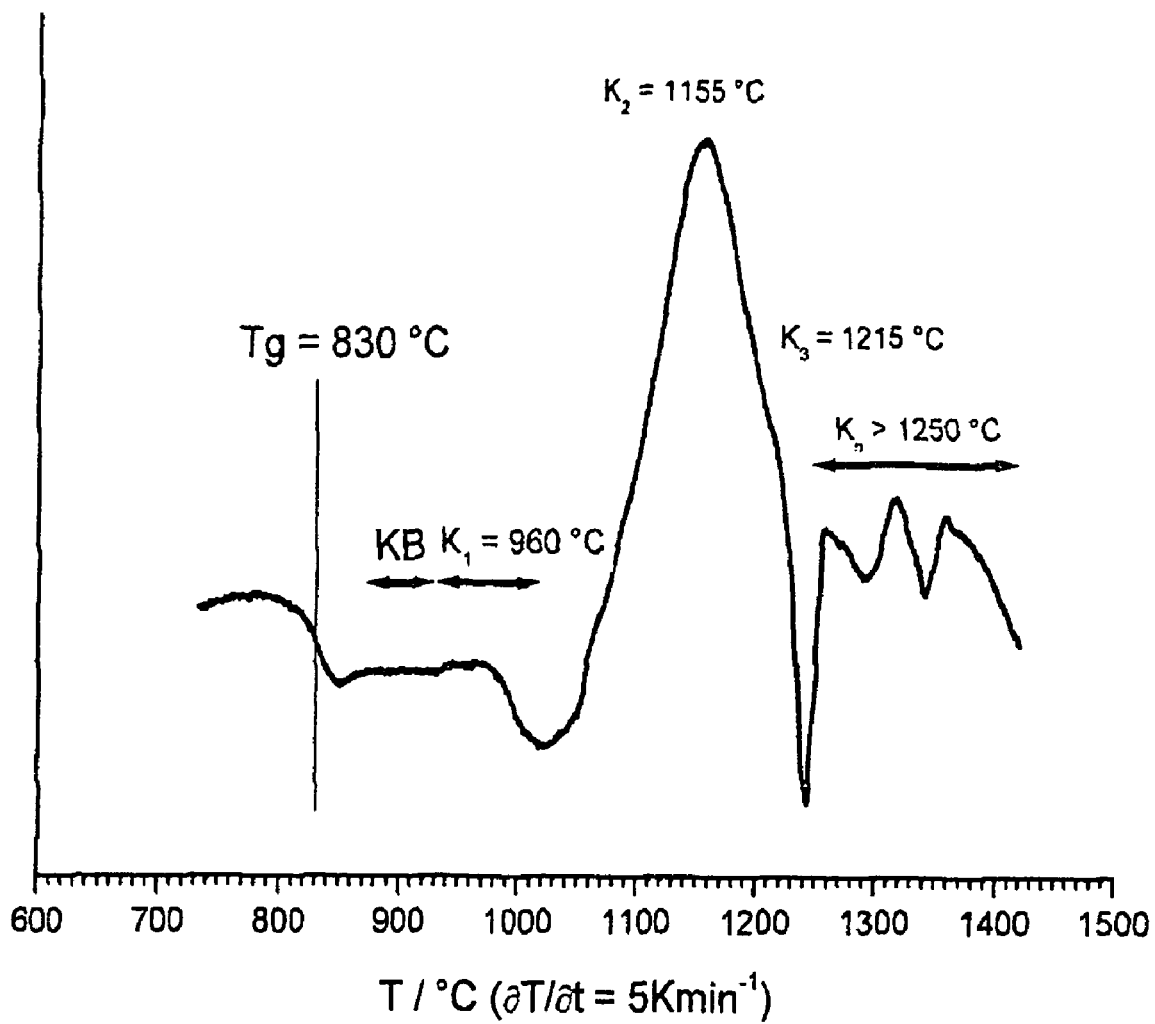
FIG. 1 shows a differential thermal analysis of a glass according to the invention.

FIG. 1 shows the result of a differential thermal analysis (DTA).

The glass transformation temperature $T_g$ is very high at 830° C.

Further heating produced crystallization temperatures for various crystal phases. Borate phases ($YBO_3$) were produced in the range denoted by "KB". $Y_2Si_2O_7$ was formed in the range denoted by K1. K2/K3 shows the transformation/recrystallization of $Y_2Si_2O_7$ phases into various isotypes (isotype: same composition, different crystal symmetry) and $Y_2SiO_5$. The borate phases may have melted in the range between K3 and KN. The range KN relates to crystallizations which were not investigated in more detail, presumably the formation of yttrium silicates.

Figure 2:
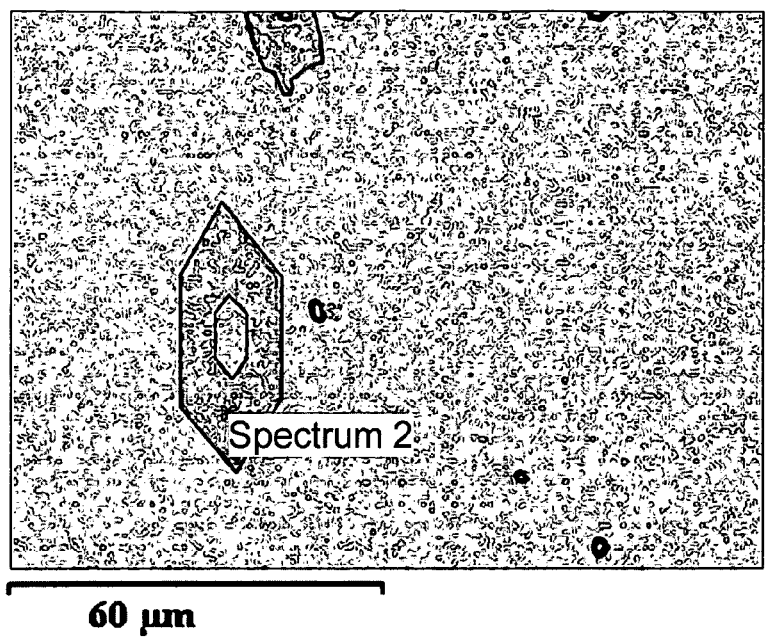
FIG. 2 shows a scanning electron microscope image of a specimen of the glass-ceramic of the exemplary embodiment shown in FIG. 1 after heat treatment for crystallization.

FIG. 2 shows an SEM image of a specimen of the glass-ceramic of the exemplary embodiment shown in FIG. 1 after heat treatment (three hours at 850° C. and one hour at 1050° C.). The ground microsection reveals a hexagonal $Y_2Si_2O_7$ crystal with partial Y—Eu substitution as well as borate crystals ($YBO_3$) as bright dots. The residual glass phase appears dark-grey on the image. The $Y_2SiO_5$ phase which was likewise detected cannot be recognized in the figure.

Figure 3:
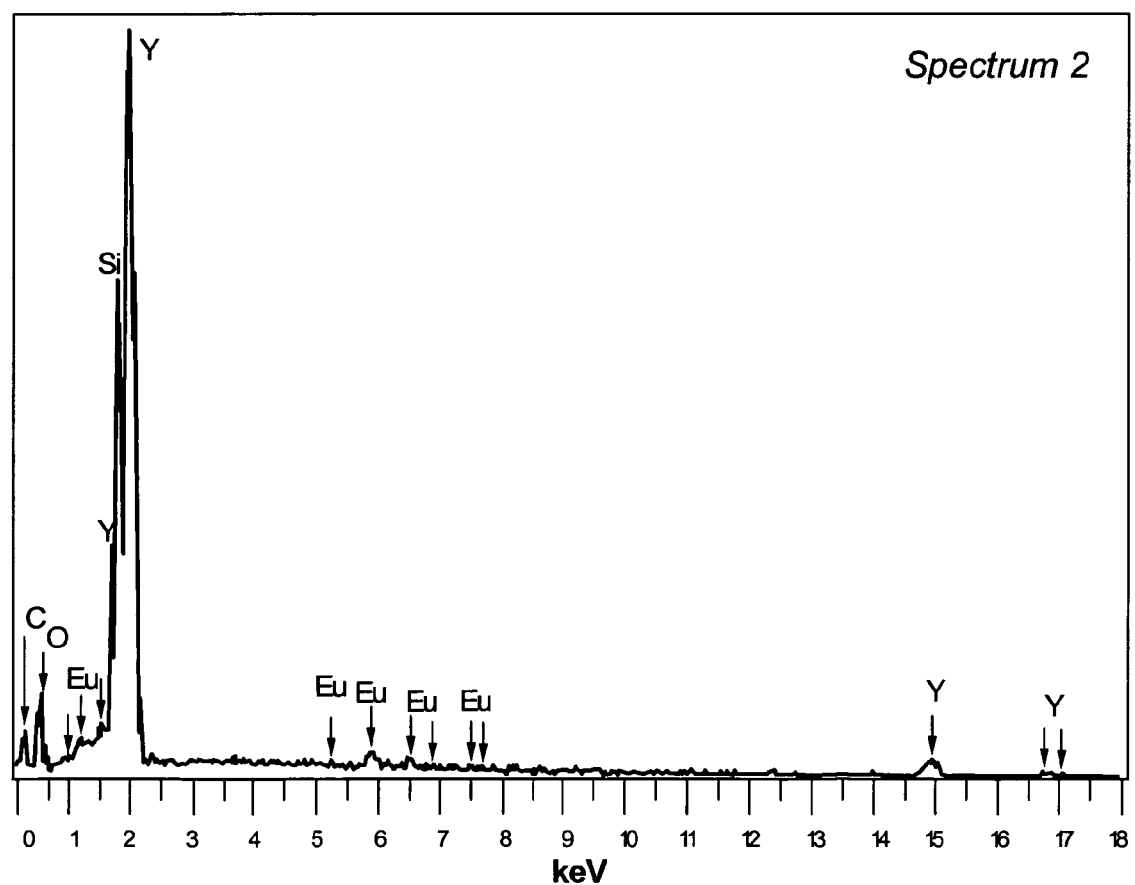
FIG. 3 shows the result of a microprobe analysis of the crystal shown in FIG. 2.

The microprobe analysis shown in FIG. 3 demonstrates that the hexagonal crystal investigated (spectrum 2) contains europium as well as yttrium, i.e. that partial Y—Eu substitution has taken place.

The above example demonstrates the high potential of the use of glasses with a high yttrium content, from which crystal phases can be precipitated to act as host phases for incorporating rare earth ions.

Further examples are summarized in table 1 (cf. examples 2-7).

The light conversion material according to the invention is suitable for converting light of an LED emitting in the blue or UV region into white light with a color rendering index, CRI that is larger than 90 or even larger than 95. The CRI is a quantitative value of color rendering capability of a light source is given by calculating the CRI, given by the numerical average of eight individual special color rendering indices, $R_1$ through $R_8$, as defined by the CIE standard "Method of Measuring and Specifying Colour Rendering Properties of Light Sources", CIE 13.3-1995.

$$CRI = (1/8)\Sigma R_i (i=1 \text{ to } 8)$$

A perfect CRI score is 100, and a functional value of CRI is more than 80.

Figure 4:
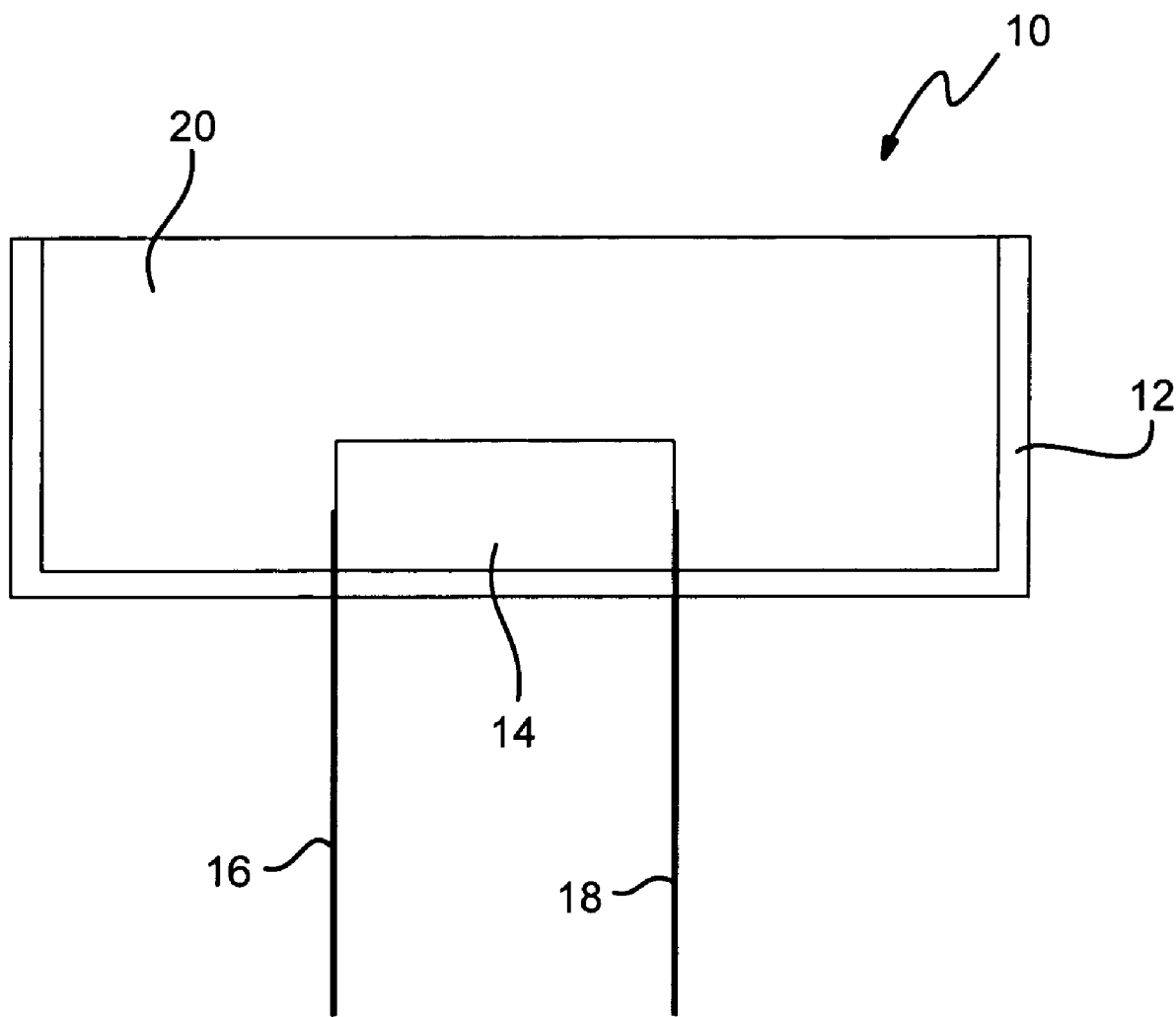
FIG. 4 shows a schematic design of an LED light source with a light conversion material according to the invention.

FIG. 4 shows a cold light source denoted by the reference number 10. The device 10 comprises an LED light emitter 14 having electrical terminals 16, 18. The LED light emitter 14 is in contact with a light conversion material 20 according to the invention, so that the light emanating from the light source 10 is at a different wavelength spectrum than the light emitted by the LED 14. The LED light emitter 14 and the conversion material 20 are commonly received within a housing 12. The device 10 may, for example, comprise the light source for the light assembly (e.g., headlight, taillight, etc.) of a vehicle.

3. The light source of claim 1, wherein said weight ratio between the weight of $Y_2O_3$ and the total weight of $SiO_2$, $Al_2O_3$ and $Y_2O_3$ is at least 0.4.

4. The light source of claim 1, in which a weight ratio between the weight of $SiO_2$ and the total weight of $SiO_2$, $Al_2O_3$ and $Y_2O_3$ is at most 0.5.

5. The light source of claim 1, in which a weight ratio between the weight of $Al_2O_3$ and the total weight of $SiO_2$, $Al_2O_3$ and $Y_2O_3$ is at most 0.6.

6. The light source of claim 1, wherein said glass ceramic comprises at least 0.1% by weight (based on oxide) of a doping with at least one rare earth ion.

7. The light source of claim 1, wherein said glass ceramic comprises a doping of at least one rare earth ion which is selected from the group consisting of Ce, Pr, Nd, Sm, Eu, Gd, Tb, Er, Tm, Yb, Dy and La.

8. The light source of claim 1, wherein said glass ceramic further comprises $B_2O_3$.

9. The light source of claim 8, wherein said glass ceramic comprises (in wt-%, based on oxide):

| | |
|---|---|
| $SiO_2$ | 5–50 |
| $Al_2O_3$ | 5–50 |
| $Y_2O_3$ | 10–80 |
| $B_2O_3$ | 0–20 |
| rare earths | 0.1–30. |

TABLE 1

| wt. % | 1 | 2 | 3 | 4 | 5 | 6 | 7 |
|---|---|---|---|---|---|---|---|
| $Al_2O_3$ | 20.91 | 29.27 | 24.39 | 31.07 | 35.07 | 35.07 | 28.8461 |
| $SiO_2$ | 23.64 | 29.27 | 28.29 | 22.33 | 23.7 | 23.7 | 28.8462 |
| $Y_2O_3$ | 46.36 | 39.02 | 44.88 | 43.69 | 36.02 | 36.02 | 38.4615 |
| $CeO_2$ | 0 | 0 | 2.44 | 2.91 | 2.84 | 2.84 | 3.8462 |
| $Eu_2O_3$ | 2.73 | 2.44 | 0 | 0 | 0 | 0 | 0 |
| $TiO_2$ | 0 | 0 | 0 | 0 | 0 | 2.37 | 0 |
| $ZrO_2$ | 0 | 0 | 0 | 0 | 2.37 | 0 | 0 |
| $B_2O_3$ | 6.36 | 0 | 0 | 0 | 0 | 0 | 0 |
| $Al_2O_3/(Y_2O_3+SiO_2+Al_2O_3)$ | 0.23 | 0.30 | 0.25 | 0.32 | 0.37 | 0.37 | 0.30 |
| $SiO_2/(Y_2O_3+SiO_2+Al_2O_3)$ | 0.26 | 0.30 | 0.29 | 0.23 | 0.25 | 0.25 | 0.30 |
| $Y_2O_3/(Y_2O_3+SiO_2+Al_2O_3)$ | 0.51 | 0.40 | 0.46 | 0.45 | 0.38 | 0.38 | 0.40 |
| Ceramization | 850° C./3 h + 1050° C./1 h | 900° C./2 h + 1150° C./1 h | 900° C./2 h + 1150° C./1 h | 900° C./2 h + 1150° C./1 h | 900° C./2 h + 1150° C./1 h | 900° C./2 h + 1125° C./1 h | 900° C./2 h + 1150° C./1 h |
| Crystal phases | $Y_2Si_2O_7$, $Y_2Si_2O_5$, $YBO_3$ | | | | | | |
| Luminescence with UV radiation (250–400 nm) | glassy: orange ceramized: bright orange | glassy: orange ceramized: bright orange | glassy: blue ceramized: bright blue | glassy: blue ceramized: bright blue | glassy: blue ceramized: bright blue | glassy: blue ceramized: bright blue | glassy: blue ceramized: bright blue |

What is claimed is:

1. A light source comprising a light emitter and a conversion material for converting light from the light emitter of a first wavelength spectrum into light of a second wavelength spectrum, wherein said conversion material comprises a glass-ceramic that is configured as a molten and heat-treated material having precipitated crystals therein and comprises at least the constituents $SiO_2$, $Al_2O_3$, $Y_2O_3$, and rare earth ions, wherein a weight ratio between the weight of $Y_2O_3$ and the total weight of $SiO_2$, $Al_2O_3$ and $Y_2O_3$ is at least 0.2.

2. The light source of claim 1, wherein said weight ratio between the weight of $Y_2O_3$ and the total weight of $SiO_2$, $Al_2O_3$ and $Y_2O_3$ is at least 0.3.

10. The light source of claim 9, wherein said glass ceramic comprises (in wt.-%, based on oxide):

| | |
|---|---|
| $SiO_2$ | 10–40 |
| $Al_2O_3$ | 10–40 |
| $Y_2O_3$ | 20–70 |
| $B_2O_3$ | 1–15 |
| rare earths | 0.5–15. |

11. The light source of claim 10, wherein said glass ceramic comprises (in wt.-%, based on oxide):

| | |
|---|---|
| SiO$_2$ | 15–35 |
| Al$_2$O$_3$ | 15–35 |
| Y$_2$O$_3$ | 25–60 |
| B$_2$O$_3$ | 1–10 |
| rare earths | 1–15. |

12. The light source of claim 1, wherein said glass ceramic further comprises additions of at least one component selected from the group consisting of SrO, BaO, CaO, P$_2$O$_5$, Ga$_2$O$_3$, Na$_2$O, K$_2$O, Li$_2$O, TiO$_2$, ZrO$_2$ and Ta$_2$O$_5$.

13. The light source of claim 1, wherein said glass ceramic comprises less than 5% by weight of ZrO$_2$.

14. The light source of claim 1, wherein said glass ceramic comprises at least one crystalline phase which at least partially incorporates rare earth ions.

15. The light source of claim 14, wherein said glass ceramic comprises at least one crystalline phase including as a constituent yttrium ions which are at least partially replaced by rare earth ions.

16. The light source of claim 14, wherein said glass ceramic comprises at least one crystalline phase selected from the group consisting of Y$_3$Al$_5$O$_{12}$, Y$_2$SiO$_5$, Y$_2$Si$_2$O$_7$, SrAl$_2$O$_4$, BaMgAl$_{10}$O$_{17}$, Sr$_2$P$_2$O$_7$, Sr$_4$Al$_{14}$O$_{25}$ and YBO$_3$, said at least one crystalline phase serving at least partially as a host phase for incorporating at least one rare earth ion.

17. The light source of claim 14, wherein said glass ceramic comprises at least one crystalline phase dispersed within a residual glass, wherein rare earth ions are incorporated in said residual glass.

18. The light source of claim 1, wherein the conversion material is disposed in direct contact with the light emitter.

19. The light source of claim 18, wherein said light emitter comprises an LED.

20. The light source of claim 19, wherein said conversion material is deposited directly onto said LED while in said molten state.

21. A method for converting a first radiation emitted by a light emitter into a different radiation by passing the light from the light emitter through a conversion material comprising a glass ceramic, and configuring the glass ceramic as a molten and heat-treated material having precipitated crystals therein and comprises at least the constituents SiO$_2$, Al$_2$O$_3$, and Y$_2$O$_3$, and rare earth ions, wherein a weight ratio between the weight of Y$_2$O$_3$ and the total weight of SiO$_2$, Al$_2$O$_3$ and Y$_2$O$_3$ is at least 0.2.

22. The method of claim 21, wherein the glass ceramic is further configured so that a weight ratio between the weight of SiO$_2$ and the total weight of SiO$_2$, Al$_2$O$_3$ and Y$_2$O$_3$ is at most 0.5, and wherein a weight ratio between the weight of Al$_2$O$_3$ and the total weight of SiO$_2$, Al$_2$O$_3$ and Y$_2$O$_3$ is at most 0.6.

* * * * *